United States Patent
Zhang

(10) Patent No.: US 10,414,066 B2
(45) Date of Patent: Sep. 17, 2019

(54) SLURRY DISPENSE SYSTEM

(71) Applicant: Jing Zhang, Redondo Beach, CA (US)

(72) Inventor: Jing Zhang, Redondo Beach, CA (US)

( * ) Notice: Subject to any disclaimer, the term of this patent is extended or adjusted under 35 U.S.C. 154(b) by 221 days.

(21) Appl. No.: 15/407,208

(22) Filed: Jan. 16, 2017

(65) Prior Publication Data

US 2018/0200920 A1   Jul. 19, 2018

(51) Int. Cl.
| | | |
|---|---|---|
| *B28B 1/00* | (2006.01) | |
| *B01F 15/02* | (2006.01) | |
| *B28C 5/12* | (2006.01) | |
| *B33Y 30/00* | (2015.01) | |
| *B28C 7/16* | (2006.01) | |
| *B01F 7/24* | (2006.01) | |
| *E04G 21/04* | (2006.01) | |

(52) U.S. Cl.
CPC .............. *B28B 1/001* (2013.01); *B01F 7/246* (2013.01); *B01F 7/248* (2013.01); *B01F 15/0283* (2013.01); *B28C 7/161* (2013.01); *B28C 7/163* (2013.01); *B28C 7/167* (2013.01); *B33Y 30/00* (2014.12); *E04G 21/0427* (2013.01); *B01F 2215/0047* (2013.01); *E04G 2021/049* (2013.01)

(58) Field of Classification Search
CPC ......... B28B 1/001; B33Y 30/00; B29C 64/20; B29C 64/209; B28C 7/167; B28C 7/163; B28C 7/161; B01F 15/0283; B01F 7/246; B01F 7/248; B01F 2215/0047; E04G 21/04
See application file for complete search history.

(56) References Cited

U.S. PATENT DOCUMENTS

| | | | | |
|---|---|---|---|---|
| 5,402,351 A | * | 3/1995 | Batchelder | B29C 41/36 264/401 |
| 5,656,230 A | * | 8/1997 | Khoshevis | B28B 3/20 264/308 |
| 5,764,521 A | * | 6/1998 | Batchelder | B29C 41/36 156/244.21 |
| 2002/0192093 A1 | * | 12/2002 | Gantenhammer | F04C 2/1073 418/48 |
| 2008/0213419 A1 | * | 9/2008 | Skubic | B33Y 30/00 425/113 |
| 2012/0251688 A1 | * | 10/2012 | Zimmerman | A23G 1/206 426/383 |
| 2013/0150266 A1 | * | 6/2013 | Tisone | B01J 19/0046 506/37 |
| 2014/0252668 A1 | * | 9/2014 | Austin | B28B 3/20 264/40.7 |

(Continued)

OTHER PUBLICATIONS

The Engineering ToolBox, Positive Displacement Pumps, Feb. 14, 2018, entire document (Year: 2014).*

(Continued)

*Primary Examiner* — Anthony Calandra
*Assistant Examiner* — Jerzi H Moreno Hernandez
(74) *Attorney, Agent, or Firm* — Xuan Zhang

(57) ABSTRACT

A slurry dispense system utilizes a buffer chamber to release the pressure from the supply pump, and buffer the irregular flow rate of the supply pump. It also utilizes a positive displacement pump to control the dispense flow. With the help of the buffer chamber, the positive displacement pump is able to provide a constant flow rate, and can be accurately controlled. A high resolution and a high speed can be achieved at the same time.

20 Claims, 4 Drawing Sheets

(56) References Cited

U.S. PATENT DOCUMENTS

| | | | | |
|---|---|---|---|---|
| 2015/0360407 A1* | 12/2015 | Ito | ............................ | B28B 3/269 |
| | | | | 264/209.2 |
| 2016/0121546 A1* | 5/2016 | Yao | ......................... | B33Y 10/00 |
| | | | | 428/221 |
| 2017/0021527 A1* | 1/2017 | Grivetti | .................... | E04G 21/04 |
| 2017/0251713 A1* | 9/2017 | Warner | ................. | B29C 64/106 |

OTHER PUBLICATIONS

PowerZone, Screw pump, 2018, https://www.powerzone.com/resources/glossary/screwpump (Year: 2018).*

\* cited by examiner

SLURRY DISPENSE SYSTEM

BACKGROUND

1. Field of the Invention

The present invention relates to a slurry dispense system. More particularly, the system dispenses fluidic materials with accurate flow control and is adopted for concrete 3D printing.

2. Discussion of the Related Art

Construction industry is an ancient but still a promptly developing industry which keeps seeking new technologies to reduce the cost, increase the efficiency, and create new effects. 3D printing is one of these computer aided manufacturing techniques getting more and more attention. 3D printing has many advantages including quick production, less waste, high flexibility, accessibility, etc. which has great potential in construction manufacturing. The objects of 3D printing vary from a small vase to a whole castle.

Three dimensional (3D) printing is also known as additive manufacturing. It is achieved by placing some special material layer by layer according to a particular 2D pattern. The placed material will solidify, and with these layers accumulated, a 3D object is formed. The whole process is controlled by computer, so it can produce complex objects fast and efficiently.

Concrete is the fundamental construction material and is widely used in almost every aspect of construction industry. Fortunately its physical characteristics are very suitable for 3D printing. Concrete is a mixture of water and high density solids such as sand and cement. The fluidic property makes it possible to be dispensed continuously by a pump. Also concrete is viscose and will be solidified by itself quickly. Therefore, when a layer of concreted is solidified, additional concrete can be dispensed and attached over it to form a new layer. These facts satisfy the basic requirement of 3D printing.

In recent technique, a concrete 3D printer usually employs a supply pump system to push concrete continuously to a nozzle through a soft pipe. This nozzle is held by a positioning system which is controlled by a computer to move the nozzle to predetermined position in 3 dimension space. This nozzle usually contains a valve to turn on and off the concrete flow. When the valve is on, concrete is sprayed out to print a line when the nozzle is moving. When these concrete lines solidify, a layer of pattern is formed. By accumulating layer over layer, a 3D concrete object is formed.

The success of 3D printing in industry application relies on two key factors: accuracy and speed. The first one determines the capability and quality of the printer; the second one determines the commercial efficiency. But practically, the nature of the concrete makes it difficult to improve both.

In order to achieve a required level of accuracy, the concrete flow disposed from the nozzle should be controlled precisely. When printing complex patterns, the flow rate should also cooperate with the movement of the nozzle. For example, the flow rate for printing a straight line should be different from the flow rate for printing a curve in order to make a substantially homogeneous line. But concrete is heavy, viscous, and abrasive. When transported in a pipe, the pressure transportation delays in distance. Since the pressure at the nozzle doesn't response the pressure change of the supply pump immediately, it is almost impossible to control the flow rate at the nozzle on time. Usually the supply pump just imposes a constant pressure so the flow rate at the nozzle keeps the same during printing. This limits the application for complex object printing.

Concrete is a mixture of solids and water. If transported in a pipe, a pressure has to be maintained to prevent the solids deposition. Therefore some 3D printers use valves to shut off the nozzles to keep a pressure when they are not printing. The problem is, when start printing, once the valve turns on the pressure in the pipe will pop the concrete out without control, which will ruin the start point of the printing. When stop printing, the valve has to shut off the concrete flow under pressure. Because the concrete has high density and is coarse, the valve has to be heavy duty, and is quite easy to be worn out and cause leaking. This also affects the performance of 3D printer.

One solution is to build the supply pump and the nozzle together to reduce the response time of the pressure. As a result, the positioning system has to support the supply pump, the nozzle, and the concrete supply all together. This largely increases the weight of the moving part. The disadvantage is obvious, the momentum is large so it is difficult to position the nozzle accurately; the supporting and positioning system should be heavy duty, and consume more energy; the moving span is limited; the size of the whole system is large and is hard to transport to the job site and set up there. Also the volume of the concrete supply is limited and is difficult to make bulky objects.

After all, it is always conflict in 3D printing in order to improve both resolution and printing speed. Usually a smaller orifice size of the nozzle provides a higher resolution but a lower printing speed; a larger orifice size of the nozzle provides a lower resolution but a higher printing speed.

Considering all these disadvantages and limitation mentioned above, it would be desirable to provide a slurry dispense system with accurate flow control in concrete 3D printing application.

BRIEF SUMMARY OF THE INVENTION

The primary objective of the present invention is to develop a slurry dispense system with accurate flow control.

Another objective of the present invention is to develop a concrete 3D printing apparatus applicable in commercial applications, particularly in construction industry.

Another objective of the present invention is to develop a concrete 3D printing apparatus with high resolution and high speed.

Another objective of the present invention is to develop a concrete 3D printing apparatus with light weight.

Another objective of the present invention is to develop a concrete 3D printing apparatus which is easy to be transport to the job site.

Another objective of the present invention is to develop a concrete 3D printing apparatus which can product items with large size.

The invention comprises the following, in whole or part:

A slurry supply component, a buffer chamber, and a flow control dispenser.

The slurry supply component comprises a supply pump and a soft pipe to transport the slurry to the buffer chamber.

The buffer chamber comprises an inlet communicating with the pipe of the slurry supply component to receive the slurry supply to maintain a predetermined rage of volume; and an outlet communicating with the flow control dispenser.

The flow control dispenser with the outlet of the buffer chamber comprises a positive displacement pump to dispense slurry with a controlled flow rate.

For a more complete understanding of the present invention with its objectives and distinctive features and advantages, reference is now made to the following specification and to the accompanying drawings.

BRIEF DESCRIPTION OF THE DRAWING(S)

DETAILED DESCRIPTION OF THE INVENTION

In accordance with a preferred embodiment, FIG. 1 to FIG. 4 depict the machine as a presently embodiment, wherein the machine comprises a slurry supply component 10, a buffer chamber 20, and a flow control dispenser 30.

Figure 1:
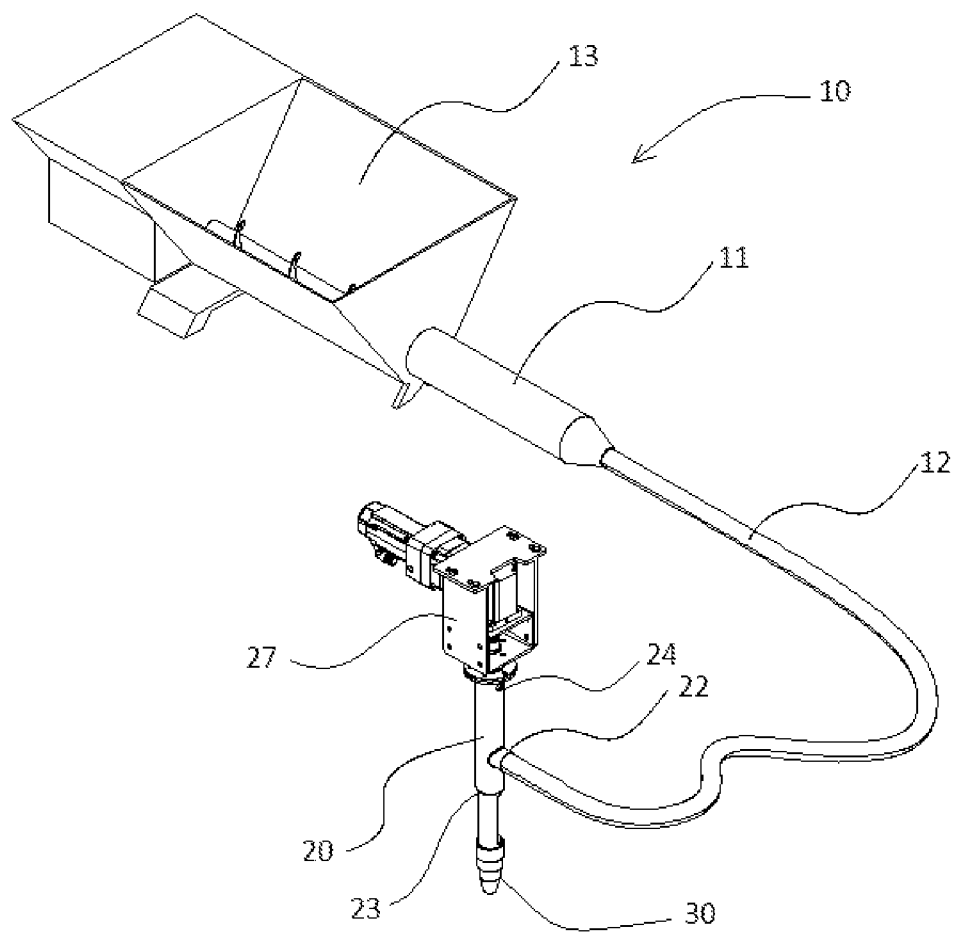
FIG. 1 is a schematic view of a slurry dispense system according to the present embodiment of the invention.

Referring to FIG. 1, the slurry supply component 10 comprises a supply pump 11, a pipe 12, and a slurry tank 13. The supply pump 11 and the pipe 12 are connected to transport the slurry from the slurry tank 13 to the buffer chamber 20 which may be a distance away. The pipe 12 is soft and flexible; therefore the buffer chamber 20 and the flow control dispenser 30 can work in a remote position, and can be moved during working, at the same time the supply pump 11 position could be fixed.

Since the tank 13 and the supply pump 11 don't need to be moved during working, the tank 13 may have a large capacity, and is easy to refill. This makes it possible for the system to work continuously for a long time. In a preferred embodiment, the slurry material is concrete, and the supply pump 11 may be a piston pump. The concrete can be mixed in the tank 13 or be filled by other means of concrete transportation, such as concrete truck.

Figure 2:
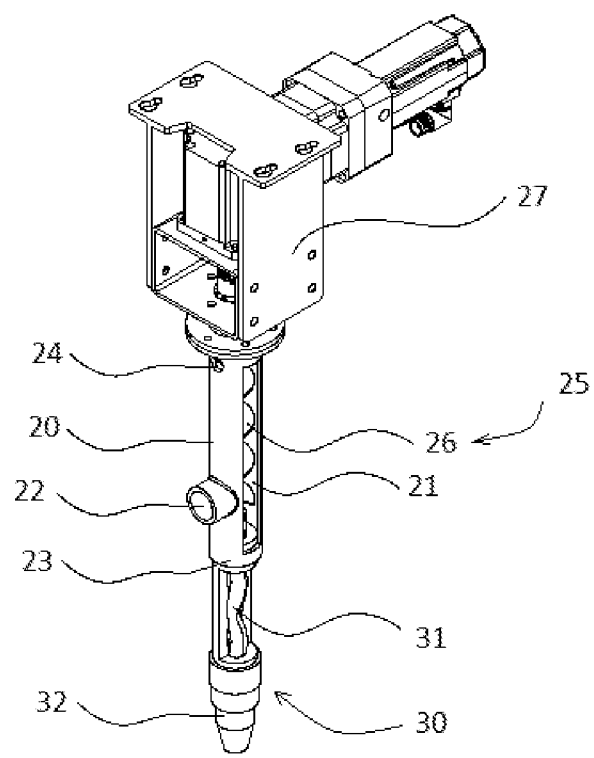
FIG. 2 is a perspective view of a slurry dispense system according to the present embodiment of the invention.
Figure 3:
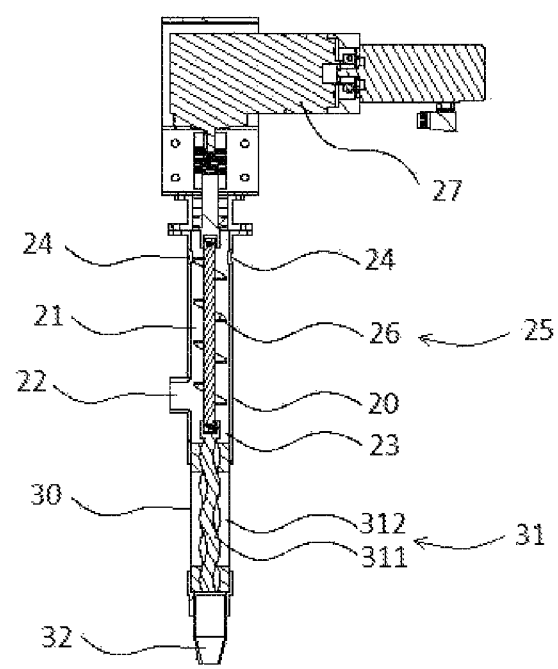
FIG. 3 is a sectional view of a slurry dispense system according to the present embodiment of the invention.

Referring to FIG. 1 to FIG. 3, in the preferred embodiment, the buffer chamber 20 is a cylinder providing a cylindrical cavity 21 inside to contain a volume of slurry. The buffer chamber 20 comprises an inlet 22 at the lower portion of the cylinder 20; and an outlet 23 at the bottom of the cylinder 20. The inlet 22 is communicatively connected with the pipe 12 to receive the slurry supplied through the pipe 12. The outlet 23 is communicatively connected with the flow control dispenser 30 to release the slurry to it.

The top of the cylinder 20 is not sealed. In the preferred embodiment, the buffer chamber 20 also comprises a release opening 24 at the upper portion of the cylinder 20 and is higher than the inlet 22. The release opening 24 releases the pressure from the slurry supply component 10. In a preferred embodiment, the release opening 24 is a hole on the side of the cylinder 20, and also works as an overflow hole 24.

In a preferred embodiment, during working, the slurry supply component 10 keeps feeding concrete to the buffer chamber 20 to maintain a certain range of volume of the concrete within the cylindrical cavity 21. The surface level of the concrete inside the cylindrical cavity 21 should not be higher than the overflow hole 24 which will limit the volume. And the surface level of the concrete should not be lower than the inlet 22 to prevent the concrete to mix with air. The cavity between these two levels defines a buffer volume for the concrete inside the buffer chamber 20.

Since the buffer chamber 20 is not sealed, the pressure from the supply pump 11 is released and will not damage the dispenser 30 or cause leaking. Also, the buffer volume absorbs the uncontrollable fluctuate of the concrete flow from the pipe 12. Therefore the irregular concrete supply will not affect the flow control of the dispenser 30.

It is worth mentioning, the buffer chamber is not a tank to supply concrete to the dispenser 30 directly. The buffer volume is determined to eliminate the inconstancy of the concrete supply, so the volume doesn't need to be large. As a result, the whole volume of the buffer chamber 20 is small, and the whole weight of the buffer chamber with the concrete inside is limited.

The supply pump 11 and the flow control dispenser 30 are synchronized and have the same flow rate in average to maintain the concrete volume. Alternatively, the buffer chamber 20 may employ a sensor to detect the surface level of the concrete to control the supply pump 11 to maintain a predetermined volume of the concrete.

The buffer chamber 20 may also comprise a mixer 25 to mix the concrete inside. In the preferred embodiment, the mixer 25 comprises a helical blade 26 longitudinally extruding inside the cavity 21 of the cylinder 20, and a motor 27 attached on the top of the cylinder 20 to drive the helical blade 26 to mix the concrete. The mixer 25 may also push the concrete towards the outlet 23.

Referring to FIG. 2 and FIG. 3, the flow control dispenser 30 comprises a positive displacement pump 31 and a nozzle 32. A positive displacement pump transports the fluid by trapping a fixed amount of volume and displacing the volume to the outlet. Theoretically positive displacement pump can produce the same flow at a given speed (RPM) if no pressure is executed to cause internal leakage. In the embodiment of the present invention, the buffer chamber 20 has released the pressure from the slurry supply component 10, therefore the positive displacement pump 31 can provide accurate control of the dispense flow, and the slurry flow can be started smoothly and shut down clearly.

Referring to FIG. 3, in the preferred embodiment of the present, the positive displacement pump 31 is a progressing cavity pump. Normally a progressive cavity pump comprises a helical rotor 311 and a twin helix, twice the wavelength helical hole in a stator 312. The rotor 311 seals tightly against the stator 312 as it rotates, forming a set of fixed-size cavities in between. The cavities move when the rotor 311 is rotated but their shape or volume does not change. The pumped material is moved inside the cavities.

The inlet of the positive displacement pump 31 is communicatively connected with the outlet 23 of the buffer chamber 20. The concrete inside the buffer chamber 20 will be fed to the positive displacement pump 31 by gravity or by the mixer 25 alternatively.

The nozzle 32 is connected to the outlet of the positive displacement pump 31 to regulate the size and position of the concrete flow. It is worth mentioning, the opening of the nozzle 32 may have different shape to regulate the contour of the concrete flow. Also, the flow control dispenser 30 may be tilted in a degree to dispense concrete.

In a preferred embodiment, the rotor 311 of the positive displacement pump 31 is coupled with the shaft of the helical blade 26 longitudinally and is driven by the motor 27. By changing the RPM of the motor 27, the flow rate of the dispenser 30 is adjusted accordingly.

Figure 4:
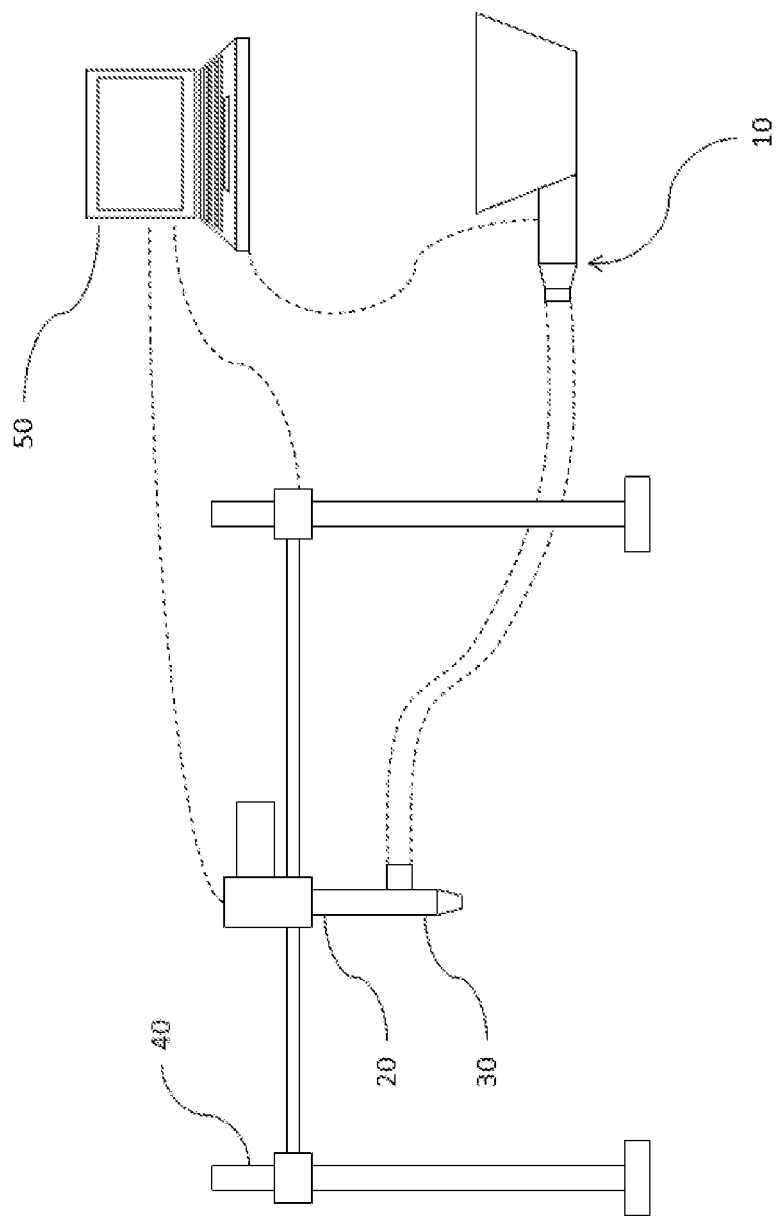
FIG. 4 is a schematic view of a concrete 3D printer according to the present embodiment of the invention.

Referring to FIG. 4, a preferred embodiment of the present invention further comprises a positioning system 40, and a control system 50 to perform concrete 3D printing. The buffer chamber 20 and the flow control dispenser 30 are coupled on the positioning system 40 and can be moved in a 3D space. The control system 50 is connected with the positioning system 40 to control the position and movement of the flow control dispenser 30 in order to dispense the concrete to form a predetermined pattern. The control system 50 is also connected with the motor 27 to control the flow rate of the positive displacement pump 31 according to the requirement of the pattern printing. The control system 50 is also connected with the slurry supply component 10 to control the slurry supply to maintain a predetermined volume of concrete in the buffer chamber 20.

In summary, the present invention utilizes a buffer chamber 20 to release the pressure from the supply pump 11, and buffer the irregular flow rate of the slurry supply component 10. As a result, the supply pump 11 and the dispenser 30 can be placed in a distance away without worrying the delay of pressure transportation; the concrete can be supplied continuously to fabricate bulky objects; the supply flow rate doesn't need to be constant; the components of the dispenser 30 are not required to be high pressure resistance; and the load of the positioning system is low.

The present invention also utilizes a positive displacement pump 31 to control the dispense flow. With the help of the buffer chamber 20, the positive displacement pump 31 is possible to provide a constant flow rate, and can be accurately controlled. A high resolution can be achieved because of the accuracy; at the same time, a high speed is also available.

While the embodiments and alternatives of the invention have been shown and described, it will be apparent to one skilled in the art that various other changes and modifications can be made without departing from the spirit and scope of the invention.

What is claimed is:

1. A slurry dispense system, comprising:
   a slurry supply component comprising a supply pump and a pipe for transporting a predetermined volume of slurry:
   a buffer chamber, which is an unsealed chamber, comprising a cylinder having a cavity, an inlet communicatively connected with said pipe to receive said slurry from said slurry supply component in said cavity, a release opening formed at said cylinder above said inlet for releasing pressure from said slurry supply component, and an outlet for dispensing the slurry, wherein said release opening is positioned higher than said inlet and serves as an overflow hole of said cylinder; and
   a flow control dispenser comprising:
   a positive displacement pump communicatively connected with said outlet of said buffer chamber and configured to dispense said slurry at a controlled flow rate; and
   a nozzle coupled with an outlet of said positive displacement pump and configured to regulate said dispensed slurry.

2. The slurry dispense system, as recited in claim 1, wherein said positive displacement pump is a progressing cavity pump.

3. The slurry dispense system, as recited in claim 2, wherein the surface of said slurry in said buffer chamber is maintained between the level of said release opening and the level of said inlet.

4. The slurry dispense system, as recited in claim 3, wherein said buffer chamber further comprises a helical blade extending inside said buffer chamber, and a motor coupled with said helical blade to rotate said helical blade to mix said slurry.

5. The slurry dispense system, as recited in claim 4, wherein said progressing cavity pump comprises a rotor which is coupled with said helical blade, wherein said rotor and said helical blade are driven by said motor of said buffer chamber together.

6. The slurry dispense system, as recited in claim 5, wherein said release opening is at the top of said cylinder at a sidewall thereof, and said outlet is at the bottom of said cylinder, and said inlet is formed at said cylinder between said release opening and said outlet.

7. The slurry dispense system, as recited in claim 6, wherein said slurry is concrete.

8. The slurry dispense system, as recited in claim 1, wherein the surface of said slurry in said buffer chamber is maintained between the level of said release opening and the level of said inlet.

9. The slurry dispense system, as recited in claim 8, wherein said buffer chamber further comprises a helical blade extending inside said buffer chamber, and a motor coupled with said helical blade to rotate said helical blade to mix said slurry.

10. The slurry dispense system, as recited in claim 9, wherein said release opening is at the top of said cylinder at a sidewall thereof, and said outlet is at the bottom of said cylinder, and said inlet is formed at said cylinder between said release opening and said outlet.

11. The slurry dispense system, as recited in claim 10, wherein said slurry is concrete.

12. A concrete 3D printer, comprising:
    a concrete supply component comprising a supply pump and a pipe for transporting a predetermined volume of concrete;
    a buffer chamber, which is an unsealed chamber, comprising a cylinder having a cavity, an inlet communicatively connected with said pipe to receive said concrete from said concrete supply component in said cavity, a release opening formed at said cylinder above said inlet for releasing pressure from said concrete supply component, and an outlet for dispensing the concrete, wherein said release opening is positioned higher than said inlet and serves as an overflow hole of said cylinder;
    a flow control dispenser comprising:
    a positive displacement pump communicatively connected with said outlet of said buffer chamber and configured to dispense said concrete at a controlled flow rate, and
    a nozzle coupled with an outlet of said positive displacement pump and configured to regulate said dispensed concrete;
    a positioning system coupled with said buffer chamber and flow control dispenser and configured to move said buffer chamber and flow control dispenser in 3 dimensions; and
    a control system configured to control said flow rate of said flow control dispenser, said movement of said positioning system, and said transportation of said concrete supply component, wherein said flow rate is adjusted according to said movement of said positioning system.

13. The concrete 3D printer, as recited in claim 12, wherein said positive displacement pump is a progressing cavity pump.

14. The concrete 3D printer, as recited in claim 13, wherein the surface of said concrete in said buffer chamber is maintained between the level of said release opening and the level of said inlet.

15. The concrete 3D printer, as recited in claim 14, wherein said buffer chamber further comprises a helical blade extending inside said buffer chamber, and a motor coupled with said helical blade to rotate said helical blade to mix said concrete.

16. The concrete 3D printer, as recited in claim 15, wherein said progressing cavity pump comprises a rotor which is coupled with said helical blade, wherein said rotor and said helical blade are driven by said motor of said buffer chamber together.

17. The concrete 3D printer, as recited in claim 16, wherein said release opening is at the top of said cylinder at a sidewall thereof, and said outlet is at the bottom of said cylinder, and said inlet is formed at said cylinder between said release opening and said outlet.

18. The concrete 3D printer, as recited in claim 12, wherein the surface of said concrete in said buffer chamber is maintained between the level of said release opening and the level of said inlet.

19. The concrete 3D printer, as recited in claim 18, wherein said buffer chamber further comprises a helical blade extending inside said buffer chamber, and a motor coupled with said helical blade to rotate said helical blade to mix said concrete.

20. The concrete 3D printer, as recited in claim 19, wherein said release opening is at the top of said cylinder at a sidewall thereof, and said outlet is at the bottom of said cylinder.

* * * * *